United States Patent [19]
Kruschwitz

[11] Patent Number: 4,483,113
[45] Date of Patent: Nov. 20, 1984

[54] WINDOW GLASS MOUNTING ARRANGEMENTS

[75] Inventor: Werner Kruschwitz, Viersen, Fed. Rep. of Germany

[73] Assignee: Draftex Development A.G., Zug, Switzerland

[21] Appl. No.: 420,530

[22] Filed: Sep. 21, 1982

[30] Foreign Application Priority Data

Jan. 20, 1982 [GB] United Kingdom ............... 8201561

[51] Int. Cl.³ .............................................. E06B 3/62
[52] U.S. Cl. ...................................... 52/208; 52/400; 52/716
[58] Field of Search ................. 52/208, 400, 716, 718; 296/93, 201

[56] References Cited

U.S. PATENT DOCUMENTS

| | | | |
|---|---|---|---|
| 2,772,915 | 12/1956 | Renno | 296/93 |
| 2,989,338 | 6/1961 | Hezler | 52/208 |
| 3,150,421 | 9/1964 | Lickert | 52/208 |
| 3,766,697 | 10/1973 | Jackson | 52/718 X |
| 3,851,432 | 12/1974 | Griffin | 52/400 |
| 3,959,941 | 6/1976 | Smith | 52/208 X |
| 4,165,083 | 8/1979 | Dochnahl | 296/93 X |
| 4,343,121 | 8/1982 | Kruschwitz et al. | 52/208 |
| 4,347,693 | 9/1982 | Kruschwitz | 52/208 |
| 4,387,923 | 6/1983 | Choby et al. | 296/93 X |

FOREIGN PATENT DOCUMENTS

| | | | |
|---|---|---|---|
| 152419 | 9/1951 | Australia | 296/93 |
| EP80587 | 6/1983 | European Pat. Off. | 296/201 |
| 903115 | 8/1962 | United Kingdom . | |
| 1033784 | 6/1966 | United Kingdom . | |
| 2093104A | 8/1982 | United Kingdom . | |
| 2093105A | 8/1982 | United Kingdom . | |

Primary Examiner—J. Karl Bell
Attorney, Agent, or Firm—Leydig, Voit, Osann, Mayer & Holt

[57] ABSTRACT

A mounting arrangement for mounting a windshield glass is made of plastics or rubber material with an embedded metal carrier for mounting the arrangement on a flanged joint running around the window opening. The flexible material defines a slit for receiving part of a metal frame which runs around the periphery of the window glass and may be adhesively secured to it before assembly. To facilitate insertion of the window glass, the flexible material may be bent outwardly, and is then allowed to resile and locked in the resiled position by inserting a stiffening member into a slot. The arrangement provides substantially flush-mounting of the window glass, and no part of the flexible material or of the stiffening member extends further outwards of the window opening than the metal frame to any significant extent.

9 Claims, 1 Drawing Figure

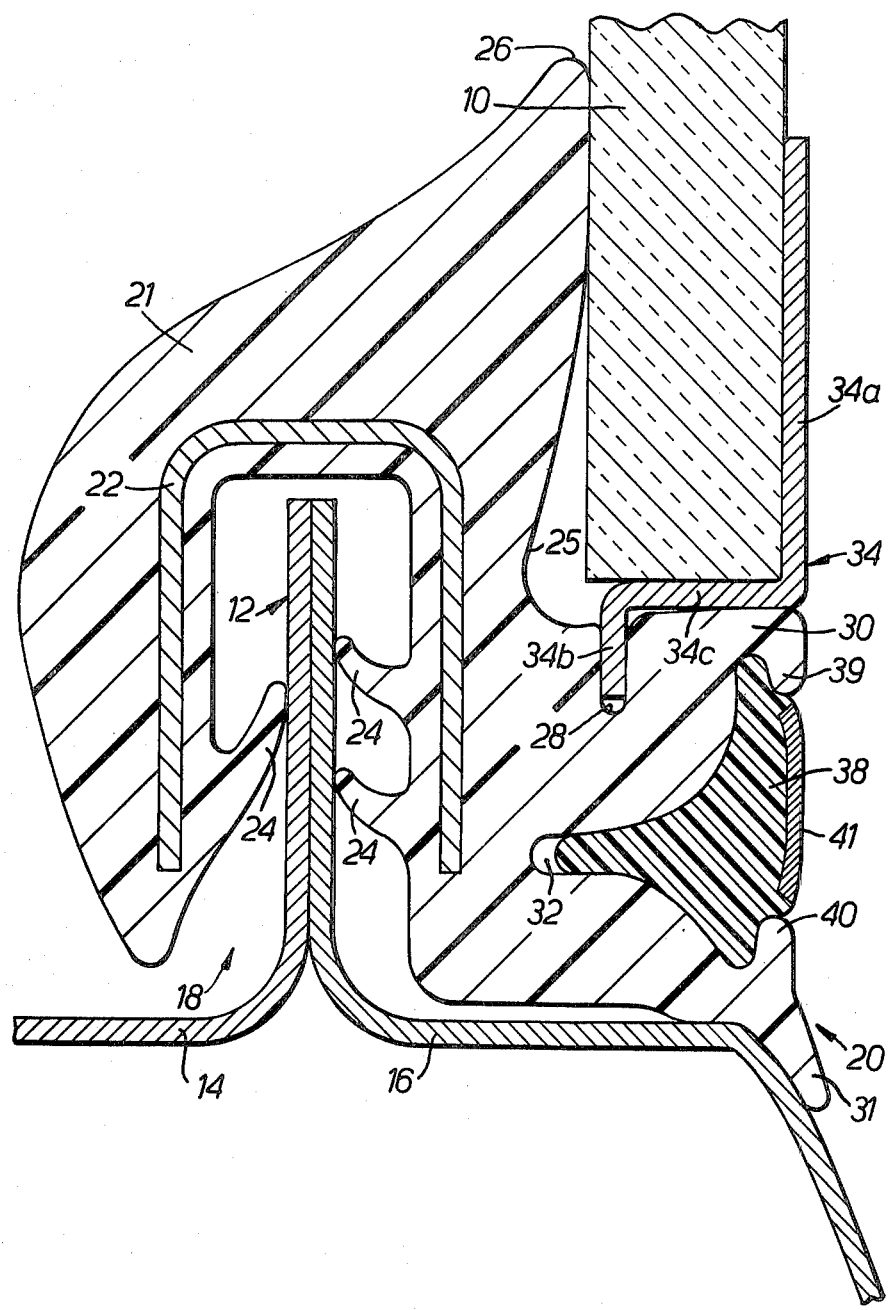

WINDOW GLASS MOUNTING ARRANGEMENTS

BACKGROUND OF THE INVENTION

The invention relates to window glass mounting arrangements such as, for example, for use in motor vehicles.

SUMMARY OF THE INVENTION

According to the invention, there is provided a window glass mounting arrangement for mounting a window glass in a frame of a window opening, comprising support means made with flexible material and for supporting the arrangement on the frame of the window opening and defining a surface of flexible material running around the window opening for receiving the window glass, the said surface defining a slit, a stiff longitudinally extending frame having projecting walls which project in opposite directions, one said wall being received in the said slit and the other engaging the outside surface of the window glass around its periphery, the flexible material defining a longitudinal slot in a face thereof facing outwardly of the window opening and spaced from the said surface, and a removable stiffening member received and held in the said slot for stiffening the flexible material alongside the said slit so as firmly to hold the frame in position.

According to the invention, there is also provided a window glass mounting arrangement for mounting a window glass in a surround running around a window opening, comprising mounting means made with flexible material and by which the mounting arrangement is supported on the said surround so as to provide flexible material defining a surface running around the window opening for receiving the peripheral edge of the window glass, the said surface defining a longitudinally extending slit, a relatively stiff frame member having a first strip-like portion received in the said slit, a base portion in contact with the peripheral edge of the window glass and a second strip-like portion which is in contact with a peripheral region on the outside surface of the window glass and projects in the opposite direction to the first portion, the flexible material being such that it does not to any significant extent project outwardly of the window opening further than the frame member, the outermost part of the flexible material defining a longitudinally extending slot which enables the flexible material on the outside of the said slit to be flexed outwardly to permit insertion of the said first strip-like portion of the frame member, and a relatively stiff longitudinally extending stiffening member sized to fit into the said slot after the flexible material on the outside of the said slot has resiled, so as to hold the frame member firmly in postion and thus to lock the window glass in the opening.

According to the invention, there is further provided a window glass mounting arrangement for holding window glass in a window opening which is defined by a flanged joint running around the window opening and providing a flange extending inwardly of and parallel to the plane of the opening, comprising longitudinally extending flexible material sized to extend around the window opening and defining a channel for sealingly gripping the flange, a channel-shaped reinforcing carrier embedded within the flexible material where it defines the channel, a relatively stiff frame member applied to the glass and a peripheral edge thereof and having an integral strip-like portion, the flexible material defining a generally ledge-shaped surface running around the channel for receiving the window glass with the frame member applied thereto, the base of the ledge-shaped surface defining a longitudinally extending slit for receiving the strip-like portion integral with the frame member, the outermost surface of the flexible material defining a longitudinally extending slot, and a relatively stiff longitudinally extending stiffening member sized to fit into the said slot, after that portion of the flexible material defining the outside wall of the said slit has been bent outwardly to permit insertion of the strip-like projection on the frame member and has then resiled, whereby to lock the frame member in the slit and to lock the window glass in position, no part of the flexible material or of the stiffening member when inserted in the said slot projecting to any significant extent outwardly of the outermost part of the frame member.

DESCRIPTION OF THE DRAWINGS

A window glass mounting arrangement embodying the invention will now be described, by way of example, with reference to the accompanying drawing which is a crosssection through the mounting arrangement.

DESCRIPTION OF PREFERRED EMBODIMENTS

The mounting arrangement now to be described in more detail is for mounting a window glass 10, such as the windshield glass of a motor vehicle, in a window opening in the vehicle which is surrounded by a bodywork flanged joint 12 lying parallel to the plane of the window opening. The flanged joint 12 is formed between two bodywork portions 14 and 16.

The mounting arrangement comprises a gripping portion 18 and a mounting and sealing portion 20.

The gripping portion 18 is channel-shaped in crosssection and is made of plastics or rubber material 21 in which is embedded a reinforcing carrier 22 of any suitable form. For example, the carrier may be made of metal and in the form of side-by-side U-shaped elements either connected together or entirely disconnected. Instead, it could be made of wire looped to and fro across the channel. Preferably, it is embedded in the material 21 by a cross-head extrusion process.

The material 21 is extruded so as to provide integral gripping lips 24.

The mounting and sealing portion 20 is formed of plastics or rubber material which is integral with the plastics or rubber material of the gripping portion 18 and extruded therewith. It is extruded so as to provide a generally L-shaped surface 25 having a lip 26 and a slot 28. In addition, it provides lips 30 and 31 defining a generally V-shaped slot 32.

The mounting arrangement shown is manufactured in strips of indeterminate length which are then cut to suit the peripheral length of the window opening and are fixed in position by placing the gripping portion 18 over the flanged joint 12 and pressing it thereon so that it firmly grips itself in position, helped by the gripping and sealing lips 24.

The window glass 10, in combination with a metal frame 34, is then placed into position in the ledge which surrounds the window opening and is formed by the L-shaped surface 25. The metal frame 34 has two substantially parallel portions 34a and 34b joined by a horizontal portion 34c. When fitting the glass 10 and the metal frame 34 into position, the lip 30 is bent outwardly into a generally horizontal attitude and is then allowed to resile when the metal frame 34 has been placed into position, so that the portion 34a of the metal frame is positioned in the slot 28. The bending outwards of the lip 30 may be facilitated by means of a cord which is placed in position in the slot 28 before the fitting process.

Finally, a stiffening member 38, made of relatively hard plastics or rubber material for example, is forced into the slot 32, around the whole length of the mounting arrangement, so as to become locked into position by the re-entrant portions 39, 40. The stiffening member 38 thus holds the lip 30 firmly in the attitude shown, locking the frame 34 into position and holding the window glass 10 firmly in the window opening. The stiffening member 38 advantageously carries a bright trim strip 41.

The lip 31 enables the arrangement to adjust itself in a variety of differently shaped body portions 16.

The mounting arrangement is advantageous because it provides an outer surface which is substantially flush with the outer surface of the window glass 10.

If desired, the mounting arrangement may be preformed into a closed loop sized to fit a particular size of window opening.

What is claimed is:

1. A window glass mounting arrangement for mounting a window glass in a frame of a window opening, comprising
   support means made with flexible material and for supporting the arrangement on the frame of the window opening and defining a surface of flexible material running around the window opening for receiving the window glass,
   the said surface defining a slit,
   a stiff longitudinally extending frame having projecting walls which project in opposite directions, one said wall being received in the said slit and the other engaging the outside surface of the window glass, around its periphery each said wall being of lesser thickness than the thickness of the window glass,
   the flexible material defining a longitudinal slot in a face thereof facing outwardly of the window opening and spaced from the said surface, and
   a removable stiffening member received and held in the said slot for stiffening the flexible material alongside the said slit so as firmly to hold the frame in position.

2. A window glass mounting arrangement for mounting a window glass in a surround running around a window opening, the surround being defined by a flanged joint running around the window opening and providing a flange extending parallel to the window opening, comprising
   flexible material defining a channel sized to fit over and grip the said flange and by which the mounting arrangement is supported on the said surround so as to provide flexible material defining a surface running around the window opening for receiving the peripheral edge of the window glass,
   a channel-shaped reinforcing carrier embedded within the flexible material where the said channel is defined therein,
   the said surface defining a longitudinally extending slit,
   a relatively stiff frame member having a first strip-like portion received in the said slit, a base portion in contact with the peripheral edge of the window glass and a second strip-like portion which is in contact with a peripheral region on the outside surface of the window glass and projects in the opposite direction to the first portion, each strip-like portion being of lesser thickness than the thickness of the window glass,
   the flexible material being such that it does not to any significant extent project outwardly of the window opening further than the frame member,
   the outermost part of the flexible material defining a longitudinally extending slot which enables the flexible material on the outside of the said slit to be flexed outwardly to permit insertion of the said first strip-like portion of the frame member, and
   a relatively stiff longitudinally extending stiffening member sized to fit into the said slot after the flexible material on the outside of the said slot has resiled, so as to hold the member firmly in position and thus to lock the window glass in the opening.

3. An arrangement according to claim 2, in which the flexible material defines gripping and sealing ribs on at least one of the inside walls of the channel for making gripping and sealing contact with the sides of the said flange.

4. An arrangement according to claim 2, in which the stiffening member is sized so that, when positioned in the said slot, it does not to any significant extent project outwardly further than the flexible material.

5. An arrangement according to claim 2, in which the stiffening member includes a decorative trim forming over its outer surface.

6. An arrangement according to claim 2, in which the frame member is made of metal.

7. An arrangement according to claim 2, in which the frame member is adhesively secured to the window glass.

8. An arrangement according to claim 2, in which the flexible material defining the said slot is arranged to define re-entrant portions running along the mouth of the slot and directed inwardly thereof so as to help to lock the stiffening member in the slot.

9. A window glass mounting arrangement for holding window glass in a window opening which is defined by a flanged joint running around the window opening and providing a flange extending inwardly of and parallel to the plane of the opening, comprising
   longitudinally extending flexible material sized to extend around the window opening and defining a channel for sealingly gripping the flange,
   a channel-shaped reinforcing carrier embedded within the flexible material where it defines the channel,
   a relatively stiff metal frame member applied to the peripheral region of the outside surface of the window glass and the peripheral edge thereof and having an integral strip-like portion, the frame member and the integral strip-like portion each having a thickness less than that of the window glass,
   the flexible material defining a generally ledge-shaped surface running around the channel for receiving the window glass with the frame member applied thereto, the base of the ledge-shaped surface defining a longitudinally extending slit for receiving the strip-like portion integral with the frame member, the outermost surface of the flexible material defining a longitudinally extending a slot, and a relatively stiff longitudinally extending stiffening member sized to fit into the said slot, after that portion of the flexible material defining the outside wall of the said slit has been bent outwardly to permit insertion of the strip-like projection on the frame member and has then resiled, whereby to lock the frame member in the slit and to lock the window glass in position, no part of the flexible material or of the stiffening member when inserted in the said slot projecting to any significant extent outwardly of the outermost part of the frame member.

* * * * *